(12) United States Patent
Du et al.

(10) Patent No.: US 11,309,706 B2
(45) Date of Patent: Apr. 19, 2022

(54) NANO GRID PROTECTION DEVICE, LARGE POWER GRID AND A METHOD FOR CONTROLLING A NANO GRID PROTECTION DEVICE

(71) Applicant: Siemens Aktiengesellschaft, Munich (DE)

(72) Inventors: Feng Du, Shanghai (CN); Yi Zhu, Kuemmersbruck (DE); Wei Gang Chen, Shanghai (CN); Zhen Liu, Shanghai (CN); Yue Zhuo, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 12 days.

(21) Appl. No.: 16/964,273

(22) PCT Filed: Feb. 6, 2019

(86) PCT No.: PCT/EP2019/052909
§ 371 (c)(1),
(2) Date: Jul. 23, 2020

(87) PCT Pub. No.: WO2019/154856
PCT Pub. Date: Aug. 15, 2019

(65) Prior Publication Data
US 2021/0036507 A1 Feb. 4, 2021

(30) Foreign Application Priority Data

Feb. 6, 2018 (CN) .......................... 201810119603.1

(51) Int. Cl.
*H02H 7/22* (2006.01)
*H02H 1/00* (2006.01)

(52) U.S. Cl.
CPC ............ *H02H 7/22* (2013.01); *H02H 1/0007* (2013.01)

(58) Field of Classification Search
CPC ...... H02H 1/0007; H02H 3/027; H02H 3/033; H02H 7/22; H02H 7/28; H02H 7/30;
(Continued)

(56) References Cited

U.S. PATENT DOCUMENTS 9,620,994 B2 * 4/2017 Bhavaraju ............... H02J 3/381
10,276,321 B2 * 4/2019 Kennedy ................ H02H 7/261
(Continued)

FOREIGN PATENT DOCUMENTS

| CN | 101702506 A | 5/2010 |
|---|---|---|
| CN | 103730883 A | 4/2014 |

(Continued)

OTHER PUBLICATIONS

International Search Report PCT/ISA/210 for International Application No. PCT/EP2019/052909 dated May 28, 2019.
(Continued)

*Primary Examiner* — Jared Fureman
*Assistant Examiner* — Nicolas Bellido
(74) *Attorney, Agent, or Firm* — Harness, Dickey & Pierce, P.L.C.

(57) ABSTRACT

Provided is a nano grid protection device for a nano grid including a distributed power supply, a large power grid including the nano grid protection device, and a method for controlling the nano grid protection device. In an embodiment, the nano grid is connected with a bus through the nano grid protection device and a main grid is connected with the bus through a main grid protection device. In an embodiment, the nano grid protection device includes: a signal unit, configured to detect and send current information passing through the nano grid protection device, the current infor-
(Continued)

mation including the magnitude and direction of the current; a controller, configured to determine, based upon the received current information, whether to send a trip signal or not; and an execution mechanism, configured to execute a trip operation of the nano grid protection device upon receiving the trip signal.

22 Claims, 6 Drawing Sheets

(58) Field of Classification Search
CPC .. H02H 1/00; H02H 3/00; H02H 5/00; H02H 6/00; H02H 7/00; H02H 9/00; H02H 11/00
See application file for complete search history.

(56) References Cited

U.S. PATENT DOCUMENTS

| | | | | |
|---|---|---|---|---|
| 2011/0282507 A1* | 11/2011 | Oudalov | ............... | H02H 3/006 700/292 |
| 2013/0018521 A1* | 1/2013 | Manson | ............. | H02J 13/0004 700/297 |
| 2013/0271879 A1* | 10/2013 | Andersen | ............... | H02H 3/044 361/20 |
| 2019/0319481 A1* | 10/2019 | Jin | ......................... | G01R 31/08 |
| 2020/0014198 A1* | 1/2020 | Lim | ....................... | H02H 9/023 |

FOREIGN PATENT DOCUMENTS

| | | | | |
|---|---|---|---|---|
| CN | 104810809 | A | | 7/2015 |
| CN | 205248782 | U | | 5/2016 |
| CN | 105870893 | A | | 8/2016 |
| CN | 106253336 | A | | 12/2016 |
| CN | 106959403 | A | * | 7/2017 |
| JP | 2017055515 | A | * | 3/2017 |
| KR | 20120096774 | A | | 8/2012 |
| KR | 101372823 | B1 | * | 3/2014 |

OTHER PUBLICATIONS

Written Opinion of the International Searching Authority for International Application No. PCT/EP2019/052909 dated May 28, 2019.
Chinese Office Action dated Jan. 6, 2021.

* cited by examiner

NANO GRID PROTECTION DEVICE, LARGE POWER GRID AND A METHOD FOR CONTROLLING A NANO GRID PROTECTION DEVICE

PRIORITY STATEMENT

This application is the national phase under 35 U.S.C. § 371 of PCT International Application No. PCT/EP2019/052909 which has an International filing date of Feb. 6, 2019, which designated the United States of America and which claims priority to Chinese Application No. CN201810119603.1 filed Feb. 6, 2018, the entire contents of each of which are hereby incorporated by reference herein, in their entirety and for all purposes.

FIELD

Embodiments of the present invention generally relate to a power grid with distributed energy sources and/or to an autonomous protection device connecting the main power grid and a nano grid in the power grid.

BACKGROUND

A micro-grid may comprise a plurality of nano grids, each of which is a small distribution system composed of distributed generators, energy storage devices, energy conversion devices, related loads, monitoring and protection devices assembling to create a small power distribution system, in which the nano grid generally refers to the power grid with a power level of 100 kW or lower. A nano grid usually operates in grid-connected mode or in disconnection with the main grids island made when connected to conventional main grids or commercial grids (e.g. 20 KV/400V commercial grids) or disconnected from the main grids. The nano grid usually consists of multiple parallel branches, each of which is equipped with protective devices, usually including miniature circuit breakers (MCBs). When a nano grid works in the grid-connected mode, its internal protection devices can usually meet the demand.

Figure 1:
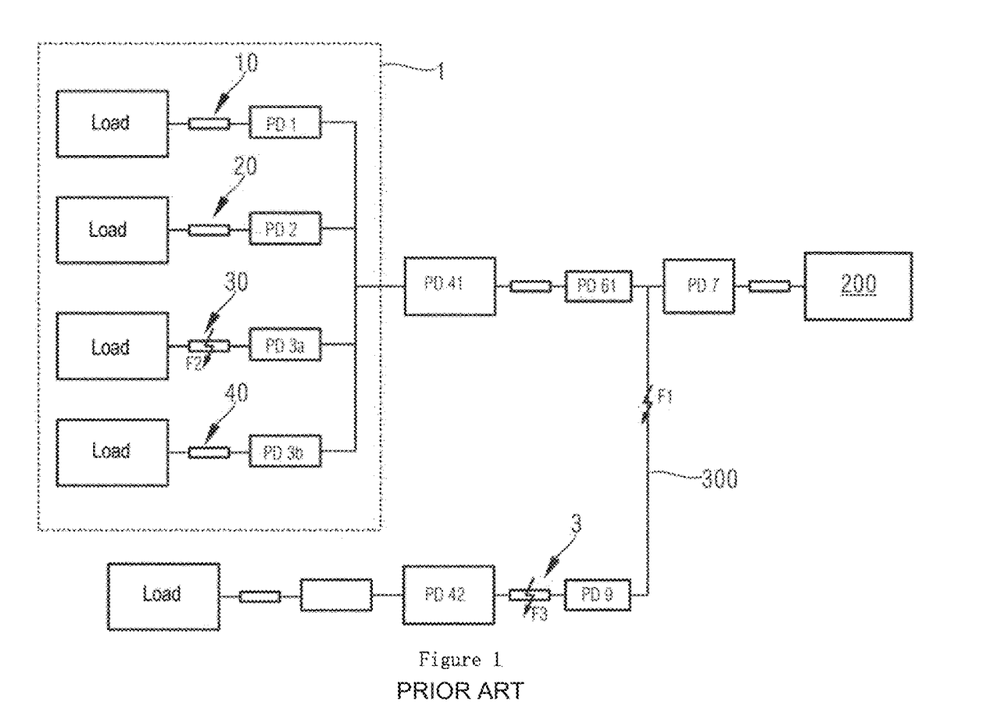
FIG. 1 shows an embodiment of a large power grid without distributed energy according to the prior art.

FIG. 1 shows a schematic diagram of a typical nano grid connecting to the main power grid without a distributed power supply. The nano grid 1 shown in FIG. 1 comprises n parallel branches (not fully shown in the figure). Each branch is equipped with a load and a miniature circuit breaker (MCB) as a protection device. Of course, in some cases, the protection devices can also be installed only on some branches. When the nano grid 1 operates through a nano grid protection device with the main power grid in grid-connected mode, for example, when F2 of branch 30 fails, the protection device 3a of branch 30 should be tripped first. When F3 of the circuit, which connects the nano grid 1 to the main power grid 200 in parallel, fails, the protective device PD9 on the circuit should be tripped first. When F1 of the circuit fails, the main power grid protection device PD7 should be tripped first. Under the nano grid without the distributed power supply, the current through the nano grid protection device PD41 all flows from the main power grid 200 to the nano grid 1, because the protection devices at all locations can be tripped normally as required and these requirements can be met. Protective devices can be miniature circuit breakers and the miniature circuit breakers that can be reset by remote control, etc.

Figure 2:
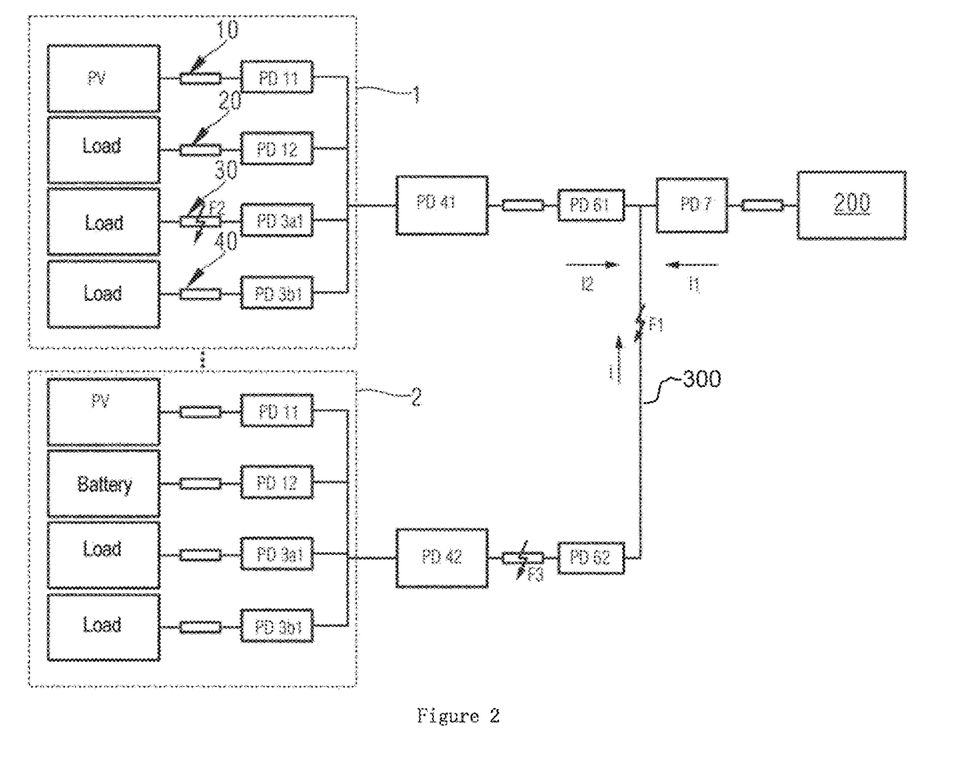
FIG. 2 shows an embodiment of a large power grid with distributed energy.

FIG. 2 shows the presence of a distributed power supply in a nano grid. As shown in FIG. 2, the grid comprises at least one of the first nano grid 1 and a remaining circuit, or exists in the form including a second nano grid 2 in the embodiment, in which, Distributed Resources (DRs), for example, photovoltaic (PV) or energy storage devices, such as batteries, are installed in the nano grid 1 and the nano grid 2. The first nano grid 1 and the second nano grid 2 are connected to a commercial grid 200 or the main power grid 200 respectively, in which the first nano grid 1 is connected in series with the first nano grid protection device PD41 to form the first nano grid branch, and the second nano grid 2 is connected in series with a second nano grid protection device PD42 to form the first nano grid branch. The first unit branch is connected in parallel to the second unit branch, followed by connecting the main power grid protection device PD7 in series with the main power grid 200. In a large grid with a nano grid comprising distributed generators, a current flowing through each nano grid a protection device may flow from a nano grid to the main power grid 200 or from the main power grid 200 to a nano grid. When F1 fails, the main power grid protection device PD7 and each nano grid protection device PD41, PD42 should be tripped first. However, for example, in the case of nano grid 1, 2 and the remaining circuit supplying the power to the main power grid 200, the current level at F1 includes the current contribution of distributed power supply in the nano grid, so the current level measured by the main power grid protection device PD7 is not enough to trigger the protection by the main power grid protection device PD7, resulting in the so-called "blind zone protection" by the main power grid protection device PD7. This is particularly serious in the case of unit circuits with multiple distributed power supply. This problem has not been solved in the prior art.

SUMMARY

One embodiment of the present invention provides a nano grid protection device with a distributed power supply, wherein the nano grid is connected with a bus through the nano grid protection device, and wherein a main power grid is connected to the bus through a main power grid protection device so as to form a large grid. The nano grid protection device comprises:

a signal unit, configured to detect and send current information passing through the nano grid protection device, the current information comprising the magnitude and direction of the current;

a control unit, configured to determine, on the basis of the received current information, whether to send a trip signal; and an execution mechanism, configured to execute a trip operation of the nano grid protection device when receiving the trip signal. In the case of the nano grid with distributed power supply, the traditional nano grid protection device cannot provide the protection and cannot solve the blind zone protection problem of the main grid, either. According to the present invention, in addition to the normal trip, the nano grid protection device can intelligently trip or close based on the level direction of the current in the additional site, so as to better protect the nano grid with distributed power supply and solve the problem of blind area protection.

Another embodiment of the invention provides a large power grid, which comprises:

at least one nano grid with a distributed power supply, each of the nano grids being connected to a bus through at least one nano grid protection device;

a branch circuit, connected to the bus through at least one branch protection device; and a main grid, connected to the bus through a main grid protection device, wherein at least one of the nano grid protection devices is a nano grid protection device according to any of the above embodiments.

Yet another embodiment of the present invention provides a method for controlling the nano grid protection device with nano grid distributed power supply, wherein the nano grid is connected to a bus by the nano grid protection device, a branch circuit is connected to the bus through at least one branch protection device in parallel with the nano grid, and wherein a main grid is connected with the bus through a main grid protection device. The method comprises:

receiving current information and voltage information passing through the nano grid protection device, the current information comprising the magnitude and direction of the current, and the voltage information at least comprising the magnitude of a voltage; and determining, on the basis of the received current information or the current information and the voltage information, whether to perform sending, wherein a trip signal is sent to an execution mechanism in the sending.

BRIEF DESCRIPTION OF THE DRAWINGS

The following drawings are intended only to provide a schematic illustration and explanation of embodiments of the present invention, instead of limiting the scope of the present invention, in which.

Reference numbers in the drawings:

| | |
|---|---|
| 1. | First nano grid |
| 2. | Second nano grid and branch |
| 10, 20, 30 and 40 | Branches in the internal nano grid |
| PD1/PD2/PD3a/PD3b | Internal protection device inside the nano grid |
| PD41 | First nano grid protection device |
| PD42 | Second nano grid protection device |
| PD61 | First nano grid standby protection device |
| PD62 | Second nano grid standby protection device |
| PD7 | Main grid protection device |
| PD9 | Branch protection device |
| 200 | Main grid |
| 300 | Bus |
| S1 | Receiving step |
| S2 | Determining step |
| S3 | Sending step |

DETAILED DESCRIPTION OF EXAMPLE EMBODIMENTS

One embodiment of the present invention provides a nano grid protection device with a distributed power supply, wherein the nano grid is connected with a bus through the nano grid protection device, and wherein a main power grid is connected to the bus through a main power grid protection device so as to form a large grid. The nano grid protection device comprises:

a signal unit, configured to detect and send current information passing through the nano grid protection device, the current information comprising the magnitude and direction of the current;

a control unit, configured to determine, on the basis of the received current information, whether to send a trip signal; and an execution mechanism, configured to execute a trip operation of the nano grid protection device when receiving the trip signal. In the case of the nano grid with distributed power supply, the traditional nano grid protection device cannot provide the protection and cannot solve the blind zone protection problem of the main grid, either. According to the present invention, in addition to the normal trip, the nano grid protection device can intelligently trip or close based on the level direction of the current in the additional site, so as to better protect the nano grid with distributed power supply and solve the problem of blind area protection.

According to a preferred embodiment, the signal unit detects the voltage information, which includes the level of voltage. In this way, it can make a judgment more accurately and avoid blind area protection.

According to a preferred embodiment, when a current flows from the main grid to the nano grid, the signal unit determines that the current is a forward current, and when a current flows from the nano grid to the main grid, the signal unit determines that the current is a reverse current.

According to a preferred embodiment, the control unit sends a trip signal after it has waited for a trip time period, in which the trip time period is that of the internal protection device within the unit intranet. In other words, the nano grid control device works as a standby protection device for the internal protection device in the internal nano grid.

According to a preferred embodiment, the control unit sends a trip signal when the reverse current continually exceeds the reverse current threshold in a delayed time period. Through this operation, when the nano grid protection device fails at F1 or F3 and the protection device at F3 does not operate, it can protect the nano grid effectively, that is, it can solve the problem of blind zone protection.

According to a preferred embodiment, when the level of the received voltage decreases, the control unit, when determining that the level of the voltage has dropped on the basis of the received information, confirms that the reverse current is a reverse fault current. By determining the voltage drop, the current change by the fault is confirmed.

According to a preferred embodiment, when the voltage is determined to be zero, the control unit described sends a trip signal, especially when the system voltage is lost, it is also tripped to protect the main power grid.

According to a preferred embodiment, when the level of the received voltage decreases, the control unit, when determining that the level of the voltage has dropped on the basis of the received information, confirms that the reverse current is a reverse fault current. By determining the voltage drop, the current change by the fault is confirmed.

According to a preferred embodiment, a branch circuit is connected to the bus in parallel with the nano grid through at least one branch protection device, in which the delayed time period is the trip time of the branch protection device.

Another embodiment of the invention provides a large power grid, which comprises:

at least one nano grid with a distributed power supply, each of the nano grids being connected to a bus through at least one nano grid protection device;

a branch circuit, connected to the bus through at least one branch protection device; and a main grid, connected to the bus through a main grid protection device, wherein at least one of the nano grid protection devices is a nano grid protection device according to any of the above embodiments.

According to a preferred embodiment, the branch circuit is a nano grid with distributed power supply, and the branch protection device is a nano grid protection device according to any of the above embodiments.

Yet another embodiment of the present invention provides a method for controlling the nano grid protection device with nano grid distributed power supply, wherein the nano grid is connected to a bus by the nano grid protection device, a branch circuit is connected to the bus through at least one branch protection device in parallel with the nano grid, and wherein a main grid is connected with the bus through a main grid protection device. The method comprises:

receiving current information and voltage information passing through the nano grid protection device, the current information comprising the magnitude and direction of the current, and the voltage information at least comprising the magnitude of a voltage; and determining, on the basis of the received current information or the current information and the voltage information, whether to perform sending, wherein a trip signal is sent to an execution mechanism in the sending.

According to a preferred embodiment, when the current direction is forward and exceeds a forward current threshold, the sending step is performed, wherein the current flows from the main grid described to the nano grid described, the current is the forward current, and when the current flows from the nano grid described to the main grid, the current is a reverse current.

According to a preferred embodiment, the sending comprises: sending the trip signal after waiting for a trip time period, the trip time period being a trip time of an internal protection device inside the nano grid.

According to a preferred embodiment, the determining comprises: when the current direction is a reverse direction and the current is greater than a reverse current threshold, determining whether to perform the sending step, wherein when the reverse current is continuously greater than the reverse current threshold within a delayed time period, the sending step is performed.

According to a preferred embodiment, the determining comprises: when the voltage is reduced, determining that the reverse current is a reverse fault current.

According to a preferred embodiment, the delayed time period is a trip time of the branch protection device.

According to a preferred embodiment, the determining comprises: when it is determined that the voltage is zero, performing the sending step.

Through the design of the nano grid protection device according to at least one embodiment of the present invention and the control method of the nano grid protection device, each nano grid is connected to the bus through an intelligent protection device, which can determine the location of the fault, provide timely protection for the nano grid, and avoid the blind zone protection problem of the main power grid protection device.

In order to understand the technical features, purposes and effects of the present invention more clearly, the specific embodiments of the present invention are described with reference to the accompanying drawings.

FIG. 2 shows the distributed power supply in at least one nano grid. Here, two of the nano grids are illustrated in examples. Among them, the first nano grid 1 and the second nano grid 2 are equipped with distributed power supply. The first nano grid 1 is connected in series with the first nano grid protection device PD41 to form the first nano grid branch (it can also be equipped with a first standby protection device PD61 after it is connected to the first nano grid protection device PD41) and connected to the bus 300; wherein the second nano grid 2 is connected in series with the second nano grid protection device PD42 to form the second nano grid branch (it can also be equipped with a second standby protection device PD62 after it is connected to the second nano grid protection device PD42) and connected to the bus 300. Although not shown, more nano grids can be equipped in this large power grid, which are connected to the bus 300 through a nano grid protection device and a standby protection device respectively. In addition, the main grid 200 is connected to the bus 300 through a main grid protection device PD7.

In this large power grid with distributed power supply, when the current flows from the main grid 200 to each nano grid through the protection devices of each nano grid, the current is said to be in forward direction, or when the current flows from the outside nano grid to the inside nano grid through the protection devices of the nano grid, the current is said to be a forward current. When a current flowing through each nano grid protection device flows from the nano grid to the main power grid, the current is said to be in a reverse direction, or when the current direction flows from the nano grid to the outside nano grid through the nano grid protection device, it is said to be a reverse current.

In the large power grid shown in FIG. 2, when F1 fails:

each nano grid protection device PD41, PD42 etc. should be tripped to isolate the fault F1 from each of the nano grids;

each nano grid protection device PD41, PD42 should be tripped before each branch protection device PD11, PD21 etc. in the nano grid; and appear the blind zone protection as described in the prior art should not occur in the main grid protection device PD7.

The above cannot be achieved in the prior art. Specifically, as shown in FIG. 2, when F1 fails, the bus current I flowing through the bus is the sum of the current I1 flowing out from the main power grid and the current I2 flowing out from the each nano grid 1 and 2. In other words, I=I1+I2. That is to say, at this time, each distributed power supply also supplies the power to the fault current, so that the current flowing through the main power grid protection device PD7 becomes smaller. As a result, the fault current detected by the main grid protection device PD7 is smaller than the actual fault current I at F1, which is insufficient for the main grid protection device PD7 to be tripped. In this case, the main grid protection device PD7 has the above-mentioned problem of blind area protection in the prior art.

In addition, as shown in the figure, if F3 on the second nano grid branch fails, that is to say, when the first nano grid 1 finds that another nano grid branch has failed, the protection device PD41 of the first nano grid should not be tripped earlier than the standby protection device PD62 (which, for example, can be a fuse) on the failed nano grid branch, so that it is affected by the adjacent nano grid branch.

In addition, for example, when a fault occurs at F2, and after the fault is repaired, the first nano grid unit of the power grid protection device PD41 can be closed remotely, thus enabling the nano grid to be reconnected to the large grid.

For this purpose, a miniature circuit breaker MCB with a remote-controlled (RC) operation mechanism can be used.

To solve one or more of the above issues, an embodiment in the present invention proposes that:

Each nano grid protection device, such as the first grid protection device and/or the second grid protection device, should be able to identify the fault location and execute a series of operations based on the fault location so as to avoid the blind zone protection.

Take the first nano grid 1 as an example. It is connected to the main grid 200 through the bus 300 through the first nano grid protection device. When the first nano grid 1 fails (for example, when a failure occurs at F2), the nano grid protection device PD41 can be tripped according to the the nano grid branch which fails has no action or fails, then the first nano grid protective device PD41 is tripped so that the first nano grid 1 enters the island mode.

Figure 4:
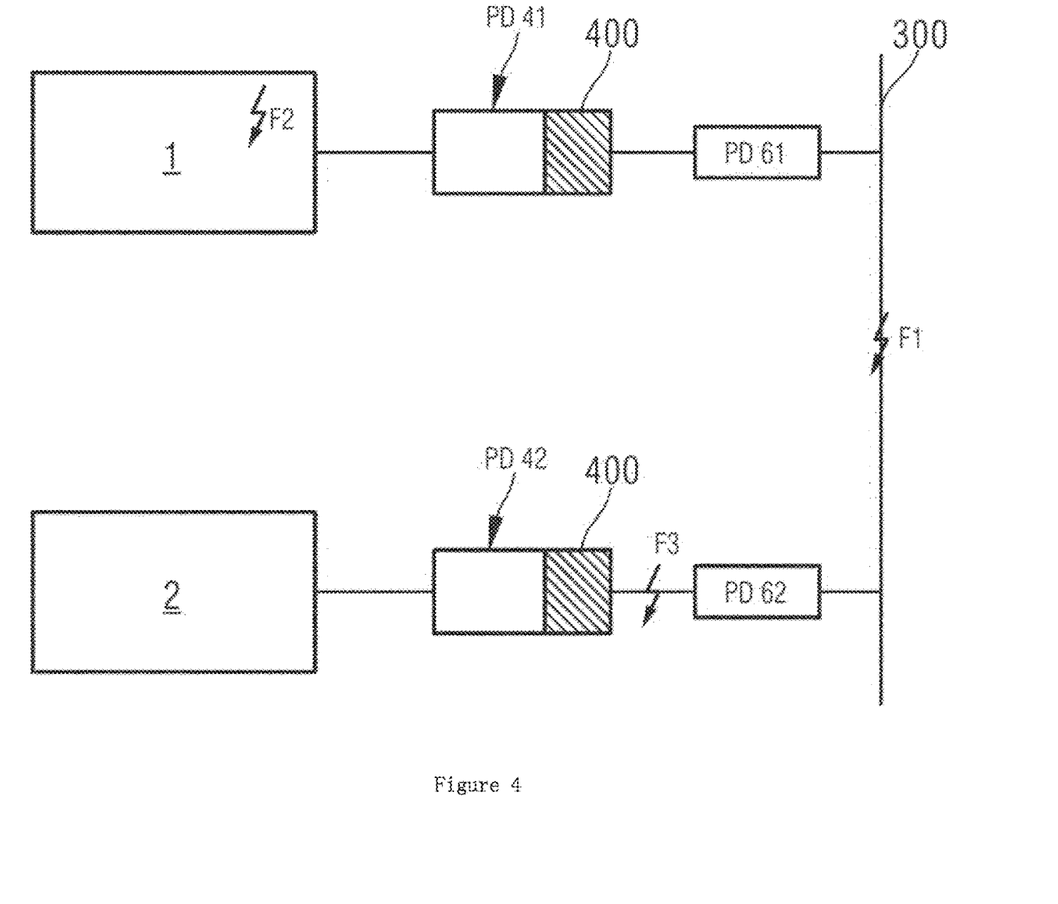
FIG. 4 shows an embodiment of a protection device with a control device according to the present invention.

The above requirements mean that the first nano grid protection device PD41 should have the ability to determine the fault location. Therefore, the control unit 400 of the first nano grid protection device PD41 should be able to have the fault detection capability based on the current, current change, voltage and voltage change etc.

In combination with FIGS. 2 and 4, the control strategies of the protective devices at key locations, such as the first nano protection device PD41, the main power grid protection device PD7, the standby protection devices PD9 or PD62 of another nano grid can be shown in Table 1 below:

TABLE 1

Protective strategies of the protection devices at various locations

Figure 3:
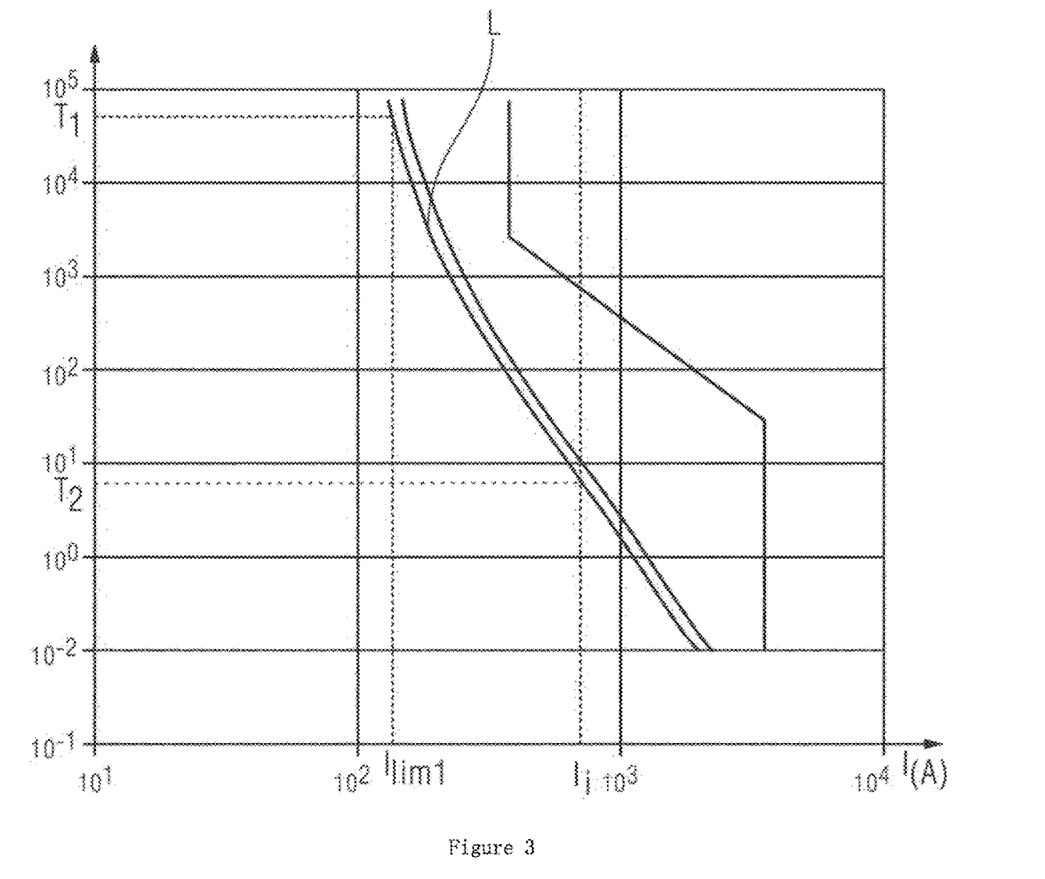
FIG. 3 shows an embodiment of a trip curve of a protection device.

| Situation | PD3 | PD41 | PD7 | PD9/PD62 |
|---|---|---|---|---|
| Failure at F1 | It is not tripped, as there is no fault current. | It is tripped when any of the following conditions are met: 1. The system voltage is lost due to the trip of PD7; 2. The reverse fault current exceeds the threshold of the reverse current and the voltage drop appears, and the fault current is not eliminated after waiting for a delayed time period $T_{pend}$. | It is tripped when the forward fault current exceeds the fault current threshold of the main power grid protection device. | It is not tripped, as there is no fault current. |
| Failure at F2 | It is tripped when the following conditions are met: Fault current exceeds the threshold value. | It offers the standby protection of the protection device PD3 in the interior nano grid, that is to say: It is tripped when the forward fault current exceeds its forward threshold. | It offers the standby protection of the first nano grid protection device PD41, that is to say: It is tripped when the forward fault current exceeds its forward threshold. | It is not tripped, as there is no fault current. |
| Failure at F3 | It is not tripped, as there is no fault current. | It offers the standby protection of the protection device PD9 and PD62 of another nano grid or another branch, and it is tripped when any of the following conditions are met: The reverse fault current exceeds the threshold of the reverse current and the voltage drop appears, and the fault current is not eliminated after waiting for a delayed time period $T_{pend}$. | It offers the standby protection of the first nano grid protection device PD41, that is to say: It is tripped when the forward fault current exceeds its forward threshold. | It is tripped when the following conditions are met: It is tripped when the forward fault current exceeds its forward threshold. | forward current trip curve. The so-called trip curve refers to the forward current trip curve as described in FIG. 3, in which the curve L shows, for example, the trip curve of the second nano grid standby protection device PD42. For example, when the forward current flowing through the protective device exceeds the current threshold $I_{lim}$, the protective device PD42 will trip in T1 seconds; for example, when the fault current becomes larger, which is $I_i$, the protective device PD42 will trip in a shorter time $T_i$ according to the curve. Correspondingly, each protection device works according to the set trip curve. The trip curve is usually an empirical curve.

When the exterior of the first nano grid 1 fails, for example, when the fault point is at F1, the first nano grid protection device PD41 should be tripped so that the first nano grid 1 enters the island mode; if the fault point is at F3, the first nano grid protection device PD41 should not be tripped immediately, but a time delay should be implemented as the standby protection of the protection device of the nano grid itself which fails. If the protective device on Among the above control strategies, the control of the first nano grid control device PD41 should be designed to meet the above protection strategies, while the control strategies of other protection devices need not be adjusted relative to the prior art.

Figure 5:
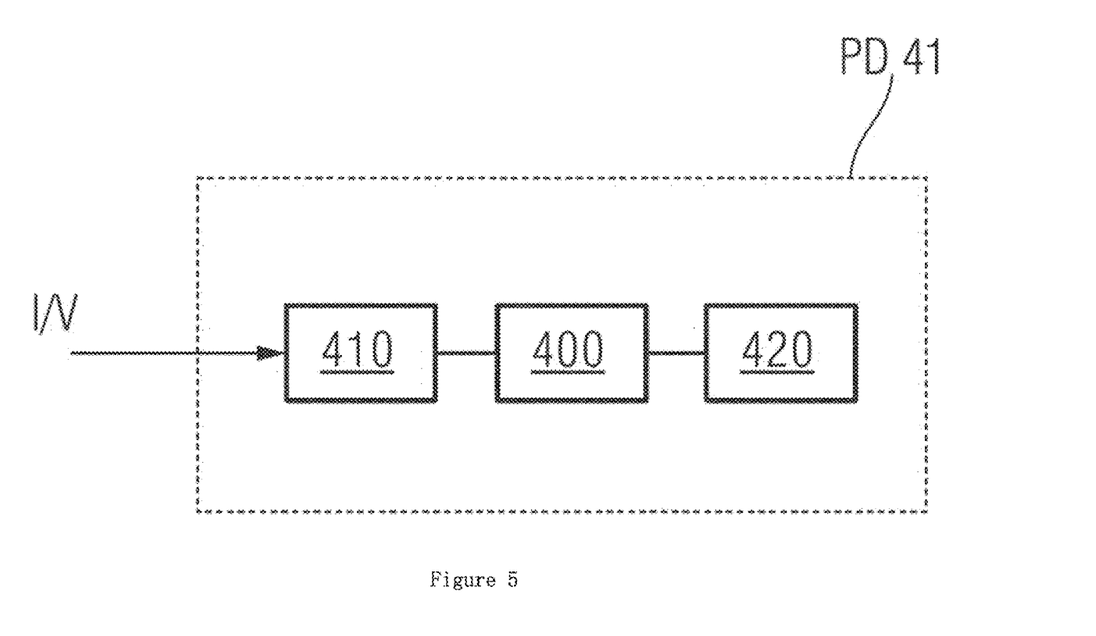
FIG. 5 shows an embodiment of a protection device according to the present invention.

According to the present invention, FIG. 5 illustrates a specific embodiment of the first nano grid control device PD41. Generally speaking, this nano grid protection device PD41 can generally comprise a control unit 400, which sends a trip signal to the execution mechanism 420 of the protection device according to its measured forward current based on the trip curve. The nano grid protection device PD41 further comprises a signal unit 410, which can detect the characteristic parameters of the current and/or voltage, and the change of current and/or voltage at the first nano grid protection device PD41. The signal unit 410 sends the characteristic parameters of voltage, current or their changes to the control unit 400 for processing. The control unit 400 may be a software module stored in a storage device 440 or a separate hardware module, or a hardware module with a storage device, or a module combined with software and hardware, among which the storage device 440 can store the forward trip curve and the reverse trip curve of the first nano grid protection device PD41.

Referring to FIG. 5 and according to the present invention, the control unit 400 can control the tripping of the first nano grid protection device PD41 based on its determining step and the following conditions:

Scenario 1: When the forward fault current I+ of the first nano grid protection device PD41 exceeds the forward current threshold $I_{+lim}$, control the first nano grid protection device PD41 for tripping, in which the forward current trip curve of the first nano grid protection device PD41 enables the first nano grid protection device to work as a standby protection device of each protection device in the internal nano grid. That is to say, in the trip curve, the forward current threshold $I_{+lim}$ and the corresponding trip time are set so that the trip time of the first nano grid protection device PD41 is longer than that of each protection device in the internal nano grid.

Scenario 2: When the reverse fault current I− of the first nano grid protection device PD41 exceeds the threshold $I_{-lim}$ of the reverse fault current, and the reverse fault current still exists in a delayed time period $T_{pend}$, it can be determined that either another nano grid branch has developed a fault F3, while the corresponding nano grid standby protection device PD62 also fails and does not move, or the bus 300 fails. In either case, the first nano grid protection device PD41 should be tripped. If the fault current no longer exists during the delayed time period $T_{pend}$, then the corresponding nano grid backup protection device PD62 should perform the tripping action. At this time, the first nano grid protection device PD41 need not perform any further action.

In addition, in order to make further accurate determination, when the first nano grid protection device PD41 finds that the reverse fault current I− has exceeded the fault current threshold $I_{-lim}$ in one direction and the voltage drop $V_d$>voltage drop threshold $V_{dlim}$ at the first nano grid protection device PD41, it can be determined to be fault current. Here, the delayed time period $T_{pend}$ can be set based on the trip curve of other nano grid protection devices, such as the protection device PD62, that is to say, the delayed time period $T_{pend}$ of PD41 of the first nano grid protection device is longer than the trip time of the protection device PD62.

Scenario 3: When the system voltage is lost, the first nano grid protection device PD41 is controlled for tripping.

In the present invention, although only the above control strategy set on the control unit 400 in the first nano grid protection device PD41 is enumerated, it can be understood that this is only an example. According to the present invention, the control strategy can be set for the control device of each nano grid protection device, or at least for a part of each nano grid protection device.

Figure 6:
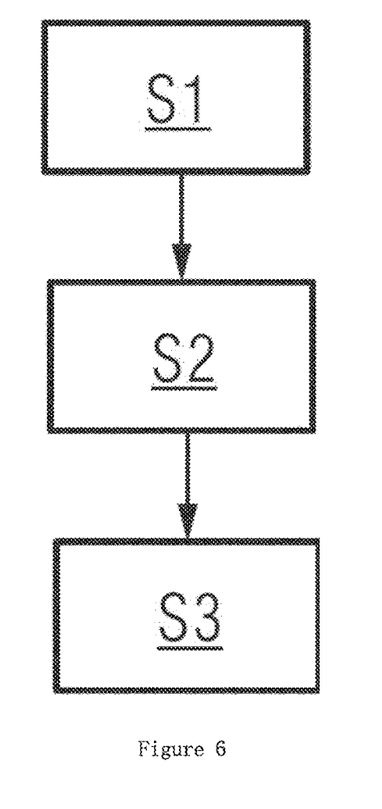
FIG. 6 shows an embodiment of the control of a protection device according to the present invention.

FIG. 6 illustrates the control method of a nano grid protection device, which is implemented through the control unit 400 of the nano grid protection device. The method comprises:

a receiving step S1: receiving current information and voltage information passing through the nano grid protection device PD41, PD42, the current information comprising the magnitude and direction of the current, and the voltage information at least comprising the magnitude of a voltage; and a determining step S2: determining, on the basis of the received current information or the current information and the voltage information, whether to perform a sending step S3, wherein a trip signal is sent to an execution mechanism 420 in the sending step.

When a current direction is a forward direction and the current is greater than a forward current threshold $I_{+lim}$, the sending step S3 is performed.

The sending step S3 described may correspond to Scenario 1, comprising sending the trip signal after waiting for a trip time period, the trip time period being a trip time of an internal protection device inside the nano grid.

In Scenario 2, the determining step S2 comprises: when the current direction is a reverse direction and the current is greater than a reverse current threshold $I_{+lim}$, determining whether to perform the sending step S3, wherein when the reverse current is continuously greater than the reverse current threshold $I_{+lim}$ within a delayed time period $T_{pend}$ the sending step S3 is performed.

The determining step S2 further comprises: when the voltage is reduced, determining that the reverse current is a reverse fault current.

In Scenario 3, the determining step S2 comprises: when it is determined that the voltage is zero, performing the sending step.

It should be understood that although this specification is described in accordance with various embodiments, it is not the case that every embodiment contains only one independent technical solution. This description of the specification is only for clarity. Those skilled in the field should view the specification as a whole, and the technical solutions in the embodiments can also be appropriately combined to form other embodiments understandable by those skilled in the art.

The above are merely particular illustrative embodiments of the present invention and are not intended to limit the scope of the present invention. Those of ordinary skill in the art can make equivalent changes, modifications and combinations without departing from the concepts and principles of the present invention, which shall fall within the protection scope of the present invention.

The invention claimed is:

1. A nano grid protection device for a nano grid with a distributed power supply, the nano grid being connected with a bus through the nano grid protection device, and a main grid being connected with the bus through a main grid protection device, the nano grid protection device comprising:

a signal unit, configured to detect and send current information passing through the nano grid protection device, the current information including a magnitude and direction of the current;

a controller, configured to determine, based upon the current information received from the signal unit, whether to send a trip signal; and an execution mechanism, configured to execute a trip operation of the nano grid protection device upon receiving the trip signal from the controller, wherein upon a current flowing from the main grid to the nano grid, the signal unit is configured to determine the current as a forward current; and upon a current flowing from the nano grid to the main grid, the signal unit is configured to determine the current as a reverse current, and wherein upon the current being determined to be the reverse current, and upon the reverse current being determined to be continuously greater than a reverse current threshold within a delayed time period, the controller is configured to send the trip signal.

2. The nano grid protection device of claim 1, wherein the signal unit is configured to detect voltage information, the voltage information including a magnitude of a voltage.

3. The nano grid protection device of claim 2, wherein upon determining that the voltage is zero, the controller is configured to send the trip signal.

4. The nano grid protection device of claim 2, wherein upon a current flowing from the main grid to the nano grid, the signal unit is configured to determine the current as a forward current; and
upon a current flowing from the nano grid to the main grid, the signal unit is configured to determine the current as a reverse current.

5. The nano grid protection device of claim 4, wherein upon the current being determined to be the forward current, and upon the forward current being determined to be greater than a forward current threshold, the controller is configured to send the trip signal.

6. The nano grid protection device of claim 5, wherein the controller is configured to send the trip signal after waiting for a trip time period, the trip time period being a trip time of an internal protection device inside the nano grid.

7. The nano grid protection device of claim 4, wherein upon the current being determined to be the reverse current, and upon the reverse current being determined to be continuously greater than a reverse current threshold within a delayed time period, the controller is configured to send the trip signal.

8. A large power grid, comprising:
the at least one nano grid with the distributed power supply, each nano grid of the at least one nano grids being connected to the bus through at least one nano grid protection device;
the branch circuit, connected to the bus through the at least one branch protection device; and
the main grid, connected to the bus through the main grid protection device, wherein at least one nano grid protection device of the at least one nano grid protection device is the nano grid protection device of claim 2.

9. The large power grid of claim 8, wherein the branch circuit is the nano grid with the distributed power supply, and wherein the branch protection device is the at least one nano grid protection device.

10. The nano grid protection device of claim 1, wherein upon the current being determined to be the forward current, and upon the forward current being determined to be greater than a forward current threshold, the controller is configured to send the trip signal.

11. The nano grid protection device of claim 10, wherein the controller is configured to send the trip signal after waiting for a trip time period, the trip time period being a trip time of an internal protection device inside the nano grid.

12. The nano grid protection device of claim 10, wherein upon the current being determined to be the reverse current, and upon the reverse current being determined to be continuously greater than a reverse current threshold within a delayed time period, the controller is configured to send the trip signal.

13. The nano grid protection device of claim 1, wherein upon determining that the magnitude of the voltage received is reduced, the controller is configured to confirm that the reverse current is a reverse fault current.

14. The nano grid protection device of claim 1, wherein a branch circuit and the nano grid are connected in parallel to the bus through at least one branch protection device, the delayed time period being trip time of the branch protection device.

15. A large power grid, comprising:
the at least one nano grid with the distributed power supply, each nano grid at least one nano grid being connected to the bus through at least one nano grid protection device;
a branch circuit, connected to the bus through the at least one branch protection device; and
the main grid, connected to the bus through the main grid protection device, wherein at least one nano grid protection device of the at least one nano grid protection device is the nano grid protection device of claim 1.

16. The large power grid of claim 15, wherein the branch circuit is the nano grid with the distributed power supply, and wherein the branch protection device is the at least one nano grid protection device.

17. A method for controlling a nano grid protection device for a nano grid with a distributed power supply, the nano grid being connected with a bus through the nano grid protection device, a branch circuit and the nano grid being connected in parallel to the bus through at least one branch protection device, and a main grid being connected with the bus through a main grid protection device, the method comprising:
receiving current information and voltage information passing through the nano grid protection device, the current information including a magnitude and a direction of the current, and the voltage information at least including a magnitude of a voltage; and
determining, based upon the current information received or the current information and the voltage information received, whether to send a trip signal to an execution mechanism, wherein
upon a current flowing from the main grid to the nano grid, the current is determined to be a forward current; and
upon a current flowing from the nano grid to the main grid, the current is determined to be a reverse current,
wherein the determining includes, upon the current direction being a reverse direction and upon the current being greater than a reverse current threshold, determining whether to send the trip signal, and upon the reverse current being continuously greater than the reverse current threshold within a delayed time period, sending the trip signal.

18. The method of claim 17, wherein upon a current direction being a forward direction and upon the current being greater than a forward current threshold, the trip signal is sent.

19. The method of claim 17, wherein the is sent after waiting for a trip time period, the trip time period being a trip time of an internal protection device inside the nano grid.

20. The method of claim 19, wherein
the determining includes, upon the voltage being reduced, determining that the reverse current is a reverse fault current.

21. The method of claim 17, wherein the delayed time period is a trip time of the branch protection device.

22. The method of claim 17, wherein
the determining includes, upon determining that the voltage is zero, sending the trip signal.

* * * * *